United States Patent
Seydoux et al.

(10) Patent No.: US 8,958,928 B2
(45) Date of Patent: Feb. 17, 2015

(54) METHOD AND AN APPLIANCE FOR REMOTELY CONTROLLING A DRONE, IN PARTICULAR A ROTARY WING DRONE

(75) Inventors: Henri Seydoux, Paris (FR); Frederic D'Haeyer, Chelles (FR)

(73) Assignee: Parrot, Paris (FR)

( * ) Notice: Subject to any disclaimer, the term of this patent is extended or adjusted under 35 U.S.C. 154(b) by 764 days.

(21) Appl. No.: 13/040,543

(22) Filed: Mar. 4, 2011

(65) Prior Publication Data

US 2011/0221692 A1    Sep. 15, 2011

(30) Foreign Application Priority Data

Mar. 11, 2010  (FR) ....................................... 10 51751
Jun. 6, 2010   (FR) ....................................... 10 54449

(51) Int. Cl.
*G05D 1/00*     (2006.01)
*G05D 3/00*     (2006.01)
*G06F 7/00*     (2006.01)
(Continued)

(52) U.S. Cl.
CPC ............... *A63H 30/04* (2013.01); *A63H 27/12* (2013.01); *G05D 1/0016* (2013.01); *G06F 3/04817* (2013.01); *G06F 3/04883* (2013.01);
(Continued)

(58) Field of Classification Search
CPC . G05D 1/0011; G05D 1/0016; G05D 1/0033; G05D 1/0808; G05D 1/101; B64C 2201/146
See application file for complete search history.

(56) References Cited

U.S. PATENT DOCUMENTS 4,817,948 A * 4/1989 Simonelli .......................... 463/6
5,327,161 A * 7/1994 Logan et al. .................. 345/157
(Continued)

FOREIGN PATENT DOCUMENTS

DE    4323795 A1 * 1/1994
EP    1 621 238 A1    2/2006
(Continued)

OTHER PUBLICATIONS

"Mario Kart Wii—Wii/Quick Strategies" (http://wikicheats.gametrailers.com/Mario_Kart_Wii_-_WII/Quick_Strategies).*
(Continued)

*Primary Examiner* — John R Olszewski
*Assistant Examiner* — Tommy Worden
(74) *Attorney, Agent, or Firm* — Haverstock & Owens LLP (57) ABSTRACT

The appliance includes a touch screen and wireless data transmission implementation for communicating with the drone. Drone piloting commands are activated by fingers contacting and/or moving over locations of corresponding piloting symbols displayed on the screen. The method proceeds by: detecting finger contact at an arbitrary contact point in at least one predefined zone of the screen on which piloting symbols are not already displayed; displaying a piloting icon on the screen at the contact point, the piloting icon including a movable icon displayed at a position that tracks any movement of the finger contact point over the screen from an initial position to an offset position; detecting the movement of the movable icon; on detecting the movement, analyzing the direction and/or the amplitude of the movement relative to the initial position; and activating a piloting command as a function of the result of the analysis.

23 Claims, 3 Drawing Sheets

(51) Int. Cl.
  *G06F 17/00* (2006.01)
  *G06F 3/041* (2006.01)
  *G06F 13/00* (2006.01)
  *A63H 30/04* (2006.01)
  *A63H 27/00* (2006.01)
  *G06F 3/0481* (2013.01)
  *G06F 3/0488* (2013.01)
  *G08C 17/02* (2006.01)
  *A63F 9/24* (2006.01)

(52) U.S. Cl.
  CPC ............ *G08C17/02* (2013.01); *A63F 2009/241* (2013.01); *G08C 2201/93* (2013.01)
  USPC ... 701/2; 701/3; 701/11; 345/173; 244/17.13; 244/189; 244/190

(56) References Cited

U.S. PATENT DOCUMENTS

| | | | | |
|---|---|---|---|---|
| 5,477,236 | A * | 12/1995 | Nanbu | 715/858 |
| 5,757,368 | A * | 5/1998 | Gerpheide et al. | 715/769 |
| 2003/0065537 | A1* | 4/2003 | Evans | 705/2 |
| 2003/0212478 | A1* | 11/2003 | Rios | 701/2 |
| 2003/0232649 | A1* | 12/2003 | Gizis et al. | 463/40 |
| 2004/0092208 | A1* | 5/2004 | Weiss et al. | 446/454 |
| 2005/0048918 | A1* | 3/2005 | Frost et al. | 455/41.2 |
| 2005/0170787 | A1* | 8/2005 | Yamamoto | 455/70 |
| 2005/0186884 | A1* | 8/2005 | Evans | 446/456 |
| 2006/0226298 | A1* | 10/2006 | Pierson | 246/1 R |
| 2007/0077541 | A1* | 4/2007 | Champagne et al. | 434/62 |
| 2008/0014835 | A1* | 1/2008 | Weston et al. | 446/484 |
| 2008/0084400 | A1* | 4/2008 | Rosenberg | 345/173 |
| 2008/0096654 | A1* | 4/2008 | Mondesir et al. | 463/31 |
| 2009/0027842 | A1* | 1/2009 | Sandell et al. | 361/681 |
| 2009/0073128 | A1* | 3/2009 | Marsden | 345/168 |
| 2009/0171516 | A1* | 7/2009 | Reich | 701/2 |
| 2009/0178006 | A1* | 7/2009 | Lemay et al. | 715/835 |
| 2009/0231722 | A1* | 9/2009 | Filipovich et al. | 359/631 |
| 2009/0241072 | A1* | 9/2009 | Chaudhri et al. | 715/863 |
| 2009/0303204 | A1* | 12/2009 | Nasiri et al. | 345/184 |
| 2010/0045705 | A1* | 2/2010 | Vertegaal et al. | 345/661 |
| 2010/0058251 | A1* | 3/2010 | Rottler et al. | 715/863 |
| 2010/0089152 | A1* | 4/2010 | Kolada et al. | 73/426 |
| 2012/0029731 | A1* | 2/2012 | Waldock et al. | 701/2 |

FOREIGN PATENT DOCUMENTS

| | | | |
|---|---|---|---|
| FR | 2849522 A1 * | 7/2004 | |
| FR | 2 903 024 A1 | 1/2008 | |
| FR | 2 912 318 A1 | 8/2008 | |
| WO | WO 0156676 A1 * | 8/2001 | |
| WO | 2009/109711 A2 | 9/2009 | |

OTHER PUBLICATIONS

"Mario Kart Wii Wikipedia Page" (http://en.wikipedia.org/wiki/Mario_kart_wii).*
"YARB" (http://surveyor.com/YARB.html#blackfin5).*
FliPhone: "How to use an iPhone to Fly R/C Airplanes and Helicopters" (http://wwwmyauntishot.com/2009/full-scale-airplanes/rc-planes/how-to-use-an-iphone-to-fly-rc-airplanes-and-helicopters) along with embedded YouTube video entitled "FliPhone—Fly R/C With Your iPhone" (http://www.youtube.com/watch?feature=player_embedded&v=72V0n1GaMsw).*

* cited by examiner

Fig. 7

METHOD AND AN APPLIANCE FOR REMOTELY CONTROLLING A DRONE, IN PARTICULAR A ROTARY WING DRONE

CROSS-REFERENCE TO RELATED APPLICATIONS

This application claims priority under 35 U.S.C. §119 to France patent application 1054449, filed Jun. 6, 2010 and France patent application 1051751, filed Mar. 11, 2010.

The invention relates to remotely controlling drones, in particular rotary wing drones, such as helicopters, quadricopters, and the like.

BACKGROUND OF THE INVENTION

A typical example of such drones is the AR.Drone from Parrot SA, Paris, France, which is a quadricopter fitted with various sensors (three-axis accelerometers and gyros, altimeter, vertically-directed camera) and with an automatic system for stabilizing the drone in hovering flight, on the principles described in WO 2009/109711 (Parrot). The drone is also provided with a front camera picking up an image of the scene towards which the drone is heading.

The automatic stabilization system serves in particular to enable the drone to reach an equilibrium point automatically, and once the equilibrium point has been reached, to provide the corrections needed for maintaining the stationary point by trimming, i.e. by correcting small variations involving movements in translation due to external effects such as movements of the air and drift of the sensors.

The drone is piloted by a user using a remote-control device referred to herein as an "appliance", which appliance is connected to the drone by a radio connection such as a WiFi (IEEE 802.11) or Bluetooth (registered trademarks) type wireless local area network.

In particularly advantageous manner, the drone may be piloted by means of a remote-control appliance that has a touch screen, wireless transceiver means, and two-axis inclination sensors constituting sensors for sensing the attitude of the housing of the appliance relative to a reference vertical direction associated with a terrestrial frame of reference. The screen of the appliance reproduces the image of the on-board front camera as transmitted over the wireless connection, together with various piloting and command symbols that are superposed on the image so as to enable the commands to be activated by the user causing a finger to make contact with the touch screen.

The user has two different possible modes of piloting, either of which modes can be activated at will.

The first piloting mode, referred to below as "autopilot mode" is the default piloting mode, and it implements the independent and automatic stabilization system of the drone. The movement of the drone is defined as being a movement from one stable state to another stable state, with the corresponding change of the stationary point being obtained by independent commands (the simplest autopilot mode consisting in merely servo-controlling the drone at a stationary point).

The second piloting mode, referred to below as the "reactive mode", is a mode in which the drone is piloted more directly by the user, by means of a combination:

firstly of signals issued by the inclination detector of the appliance; for example, in order to make the drone advance, the user tilts the appliance about the corresponding pitching axis, and in order to move the drone to the right or the left the user tilts the same appliance relative to the roll axis; and secondly commands that are available on the touch screen, in particular an "up/down" command (corresponding to a throttle command) and a "turn left/right" command (causing the drone to pivot about a yaw axis).

The changeover from autopilot mode to reactive mode is obtained by pressing a finger on a specific symbol displayed on the touch screen. Pressing the finger on this symbol causes the reactive mode to be activated immediately, and the reactive mode remains activated so long as finger contact is maintained at that location. Piloting is then obtained by tilting the appliance and/or manipulating "up/down" and turn "left/right" symbols that are displayed on the touch screen.

Autopilot mode (e.g. implemented in the manner described in above-mentioned WO 2009/109711) is activated as soon as the user removes the finger from the corresponding symbol.

That method of proceeding allows piloting to be entirely effective and intuitive; nevertheless, it presents several drawbacks.

A first drawback lies in the fact that in order to deactivate autopilot mode and switch to reactive mode piloting, the user must look at the screen of the appliance in order to put a finger accurately on the location where the symbol corresponding to the command that is to be activated is located (activate/deactivate autopilot mode; up/down; turn left/right about a yaw axis).

The user generally perceives this obligation as being a constraint, since the user must stop looking at the drone, precisely at the moment when taking over control in order to pilot the drone in reactive mode, which is awkward since the drone is piloted at sight and it is not good for the user to glance away from it. It is much easier to control the movements of the drone while looking at it, rather than looking at the video returned by the on-board camera, which does not show certain obstacles that lie outside the field of view of the camera (ceiling in an enclosed space, etc.).

In any event, although reactive mode includes commands that are intuitive (piloting by tilting the appliance about two axes), it nevertheless requires continued observation of the screen for the up/down and yaw axis turn commands (piloting by pressing on symbols displayed on the touch screen).

A second drawback stems from the fact that to perform the intuitive piloting commands by tilting the appliance one way or the other about two axes, it is necessary to hold the appliance level. Proceeding in that way is awkward, particularly outdoors, since a reflection of the sun can prevent the screen of the appliance being seen properly; to avoid such reflection, the user tilts the appliance, but then it is no longer possible to change over to reactive mode since the appliance is no longer horizontal.

A third drawback stems from the fact that reactive mode piloting requires simultaneous use of two fingers, using a finger of the left hand to activate right/left rotation commands and a finger of the right hand to activate up/down commands (or vice versa). If the user seeks to actuate some other function, e.g. an order to shoot (virtually) by pressing on a "fire" symbol displayed on the touch screen, then it is necessary to let go one of the commands in order to use the corresponding finger to press on that symbol.

A fourth drawback stems from the fact that five touch zones are defined solely for piloting, and the simultaneous use of two fingers often masks messages or information that might be essential for the user.

A fifth drawback stems from the fact that left-handed and right-handed users are treated differently since the commands are not symmetrical.

A sixth drawback stems from the fact that the drone is often an element in a video game in which the player pilots the drone and must simultaneously perform game actions, e.g. shooting at virtual or real targets. The user must then activate the shoot command very quickly, and almost instinctively, even though the user's attention is absorbed by piloting, the user's hands are busy, and the user is looking at the drone.

Other command or piloting interfaces are described for example in EP 1 621 238 A1 (emulating a joystick type pointer device at the point of contact of a stylus or finger on a touch screen) or in US 2007/077541 A1 (piloting by acting on a stylus or a finger on a steering wheel displayed on a touch screen). However neither of those proposals is capable of mitigating the above-mentioned drawbacks.

OBJECT AND SUMMARY OF THE INVENTION

The object of the invention is to remedy those various drawbacks by proposing a touch screen appliance for remotely controlling a drone such as the drone described in above-mentioned WO 2009/109711 and:

that does not require the screen to be looked at i) whether for changing over from autopilot mode to reactive mode, and vice versa, or ii) for activating piloting commands by means of symbols in reactive mode;

that leaves the user free to hold the appliance at a slope throughout the stage of piloting in reactive mode;

that requires only one finger of one hand for piloting in reactive mode, combining all of the piloting commands that are activated via the touch screen (up/down, turn right/left), the other hand then being free, and in particular free to activate special functions such as firing a virtual shot;

that enables the user to activate special commands, in particular firing, in a manner that is more intuitive and spontaneous, without any incidence on piloting proper; and finally that is compatible with using a remote display peripheral of the video glasses type, so as to make "head-up display" type piloting possible.

To this end, the invention provides a method for implementing a remote-control appliance, the appliance being constituted in known manner by a portable appliance comprising: a touch screen; means suitable for detecting at least one contact of a user's finger on the surface of the screen and for determining the position of said at least one finger contact point relative to a corresponding symbol displayed on the screen; and wireless data transmission means suitable for issuing commands to the drone. Piloting commands are activatable by the finger making contact with the screen and/or moving over the screen at the locations of corresponding piloting symbols displayed on the screen.

In a manner characteristic of the invention, the method comprises the steps of: a) detecting finger contact at an arbitrary contact point in at least one predefined zone of the screen; b) displaying on the screen, at the contact point, a piloting icon comprising a movable icon displayed on the screen at a position that tracks the movement of any of the finger contact point on the screen from an initial position to an offset position; c) detecting the movement of the movable icon; d) on detecting the movement, analyzing the direction and/or the amplitude and/or the speed of the movement relative to the initial position; and g) activating a piloting command as a function of the result of the analysis.

Advantageously, the method further comprises, after analyzing the direction and/or the amplitude and/or the speed of the movement of the finger relative to the initial position, a step of: e) discriminating the piloting command to be activated in step g) from amongst a plurality of different piloting commands, as a function of the direction of the movement. The piloting command for activating in step g) may in particular be a command for causing the drone to move up or down when the direction of the movement is oriented mainly upwards or downwards, respectively, relative to the orientation of the image displayed on the touch screen, and/or a piloting command to pivot left or right about a yaw axis of the drone when the direction of the movement is mainly oriented to the left or to the right, respectively, relative to the orientation of the image displayed on the touch screen.

The method may also provide, after analyzing the direction and/or the amplitude of the movement relative to the initial position, a step f) of quantifying the piloting command to be activated in step g) as a function of the amplitude of the movement.

When remotely controlling a rotary wing drone provided with a selectively activatable system for independently stabilizing the drone in hovering flight in the absence of any command transmitted by the appliance, the independent stabilization system is advantageously deactivated in response to detecting the finger in step a), and the independent stabilization system remains deactivated after step a) throughout the duration in which the finger contact is detected, and is activated in response to detecting a loss of contact.

In an advantageous variant, provision is made to define a neutral zone around the contact point detected in step a), the neutral zone being defined in such a manner that the independent stabilization system remains activated so long as the position of the current finger contact point remains within the neutral zone.

Preferably, the piloting icon displayed in step b) comprises, in addition to the movable icon, a stationary reference icon which continues to be displayed on the screen at the initial finger contact point position even in the event of subsequent movement of the contact point.

Most advantageously, for an appliance comprising means for detecting the angle of inclination of the appliance about two axes relative to a neutral reference axis in a terrestrial frame of reference, detecting the finger contact in step a) activates the steps of: recording the direction of terrestrial vertical relative to the frame of reference of the appliance at the moment contact is detected; and designating this vertical as the new reference axis. A piloting command for pivoting about a pitching axis and/or about a roll axis, may in particular be activated as a function of the angle of inclination of the appliance as detected respectively about one and/or the other of said two axes relative to the reference axis.

In an advantageous variant, provision is made to define a neutral angular range about the reference axis such that pitching and roll commands are activated only for angles of inclination of the appliance outside said neutral angular range. Furthermore, it is possible to make provision for the independent stabilization system of the drone to be deactivated only for an angle of inclination of the appliance outside said neutral angular range.

In another aspect of the invention, if the appliance includes an accelerometer sensor, this sensor may be used to detect an acceleration peak imparted to the appliance by the user; and to generate a command in response to detecting a peak, most particularly a shoot command applied as input to game software implemented in said appliance.

The detection may in particular make provision for high-pass filtering of the acceleration signal delivered by the accelerometer sensor, while also recording the state of the piloting commands on detecting an acceleration peak and maintaining said state throughout the duration of the peak.

In yet another aspect of the invention, the appliance may be coupled to a remote display peripheral, in particular video glasses, with the remote peripheral duplicating the piloting icon displayed on the screen so as to provide a head-up type display.

In general, the method may provide for emitting an alert signal when the minimum distance between the contact point detected in step a) and the edge of the predefined zone of the screen is less than a predetermined distance.

Provision may also be made to define a neutral zone around the contact point detected in step a), the neutral zone being such that the movement of the piloting icon in steps c) and d) is not taken into account unless the offset position is situated outside said neutral zone.

In a variant, the neutral zone may be such that the movement of the piloting icon in steps c) and d) is not taken into account unless the speed of the movement of the finger contact point over the screen relative to the initial position is greater than a predetermined minimum threshold. In the event of the contact point moving in the reverse direction at a movement speed that is greater than another predetermined minimum threshold, provision is then made for a step of resetting the initial position, the new initial position being redefined by the point where the reverse movement comes to an end.

The invention also provides an appliance for remotely controlling a drone, the appliance including means for implementing the above-described method, and software downloadable into such an appliance, including instructions suitable for implementing the method.

BRIEF DESCRIPTION OF THE DRAWINGS

There follows a description of an implementation of the invention given with reference to the accompanying drawings in which the same numerical references are used from one figure to another to designate elements that are identical or functionally similar.

MORE DETAILED DESCRIPTION

Figure 1:
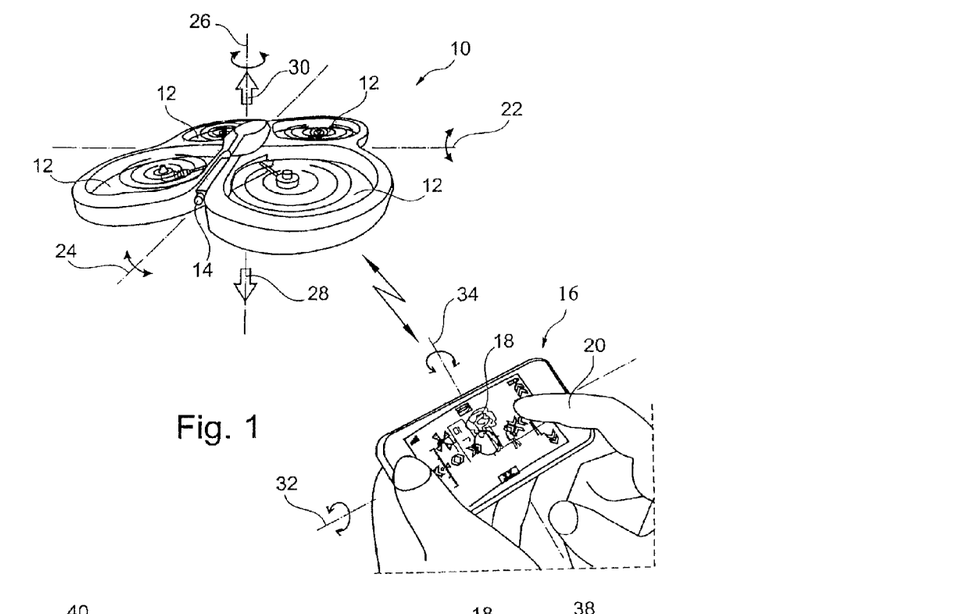
FIG. 1 is an overall view showing the drone and the associated remote-control appliance for piloting it.

In FIG. 1, reference 10 is an overall reference for a drone, e.g. a quadricopter such as the AR.Drone model from Parrot SA, Paris, France. This drone has four coplanar rotors 12 with motors that are controlled independently by an integrated navigation and attitude control system. The drone 10 also has a front camera 14 serving to obtain an image of the scene towards which the drone is directed.

The drone is provided with a self-contained stabilization system for hovering in the absence of any external command applied by a user. That system, e.g. as described in above-mentioned WO 2009/109711, makes it possible in particular to provide the necessary corrections for maintaining equilibrium at a stationary point by appropriate trimming commands, i.e. commands for correcting movements in translation due to external effects due to movements of the air and sensor drift.

The drone, 10 is piloted from a remote-control appliance 16 that is an appliance having a touch screen 18 displaying the image picked up by the camera 14 on board the drone, together with various symbols superposed thereon enabling commands to be activated merely by a user's finger 20 touching the touch screen 18.

The appliance 16 is also provided with radio connection means for communicating with the drone enabling bidirectional data exchange: from the drone 10 to the appliance 16, in particular for transmitting the image picked up by the camera 14; and from the appliance 16 to the drone 10 for sending piloting commands. By way of example, this radio connection may be a loca area network of the WiFi (IEEE 802.11) or Bluetooth (registered trademark) type.

In particular, the appliance 16 may be a multimedia appliance or a personal digital assistant, for example a cell phone of the iPhone type or a multimedia player of the iPod Touch type (trademarks registered by Apple Inc., USA), which are appliances that incorporate various control members needed for detecting piloting commands and for exchanging data with the drone over a WiFi type wireless connection.

Piloting the drone 10 consists in making it perform the following movements:

a) pivoting about a pitching axis 22 in order to move forwards or backwards; and/or b) pivoting about a roll axis 24, in order to move to the right or to the left; and/or c) pivoting about a yaw axis 26 in order to cause the main axis of the drone to turn to the right or the left and thus to turn the direction in which the front camera points and the direction in which the drone advances; and/or d) move in translation downwards 28 or upwards 30 by changing the throttle setting, respectively to reduce or to increase the altitude of the drone.

When these piloting commands are applied directly by the user from the remote-control appliance 16 (piloting in so-called "reactive" mode), commands a) and b) for pivoting about the pitching and roll axes 22 and 24 are obtained intuitively by tilting the appliance 16 respectively about the longitudinal axis 32 and about the transverse axis 34: for example in order to make the drone advance, it suffices to tilt the appliance forwards about the axis 32; and in order to shift to the right it suffices to tilt the appliance to the right about the axis 34; etc.

The commands c) and d) are the results of actions applied by the user's finger 20 making contact with specific corresponding zones on the touch screen 18.

Figure 2:
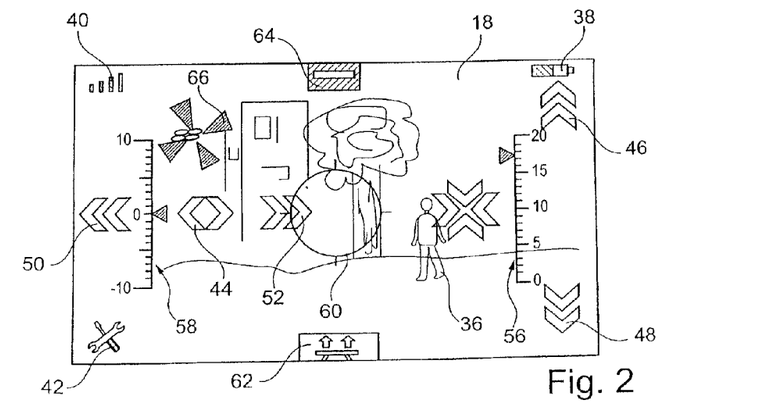
FIG. 2 is an example showing the various images and symbols displayed on the screen of the remote-control appliance, in the state of the art.

FIG. 2 shows the various images and symbols displayed on the screen 18 of the remote-control appliance, as done in the state of the art.

The screen 18 reproduces the scene 36 picked up by the front camera 14 of the drone, and various symbols 38 . . . 66 are superposed on this image, which symbols are displayed in order to deliver information about the operation of the drone, and in order to enable corresponding piloting commands to be triggered and sent by touch activation.

The appliance thus displays information at 38 relating to the state of the battery, at 40 relating to the level of the signal establishing the connection between the appliance and the drone, and at 42 giving access to a menu of settings.

The screen also displays a symbol 44 for activating reactive mode. A single press on this symbol 44 causes the drone to switch immediately to reactive mode. Releasing the symbol causes the drone to switch to autopilot mode with stabilization at the fixed point that was reached in the absence of any command, which fixed point is then kept stationary by the stabilization system incorporated in the drone.

For piloting in reactive mode, the pilot has available not only the commands that are generated by tilting the appliance, but also touch commands, in particular including up and down arrows 46 and 48 and left and right arrows 50 and 52 for pivoting in yaw.

The user also has a display of altitude data 56 and angle of inclination data 58, together with a ringsight 60 giving the direction in which the on-board camera is pointing, and thus the direction of the main axis of the drone.

Various additional symbols are also provided such as automatic control of take-off and landing at 62, triggering an emergency procedure at 64, and crosshairs at 66 for virtual shooting.

Figure 3:
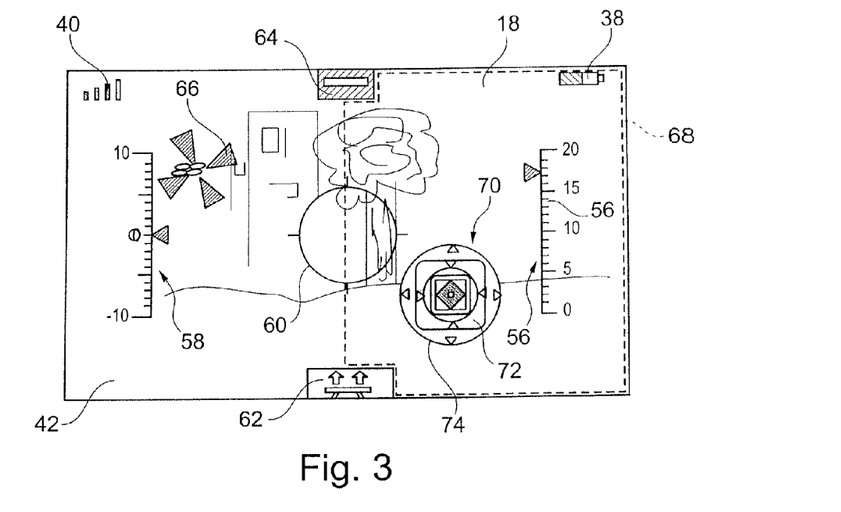
FIG. 3 corresponds to FIG. 2, but in the invention.

In a manner characteristic of the invention, these piloting commands are modified in the manner shown in FIG. 3.

Compared with FIG. 2, it can be seen in particular that the symbol 44 for activating/deactivating reactive mode, and the up/down symbols 46 and 48, and the yaw pivoting symbols 50 and 52 are omitted and replaced by the display of a single specific icon 70.

When the appliance is in autopilot mode, this specific icon 70 does not appear.

This icon 70 is displayed as soon as the user puts a finger on any point of a zone 68 of the screen, e.g. a vast area constituted by the right-hand half of the screen 18 with the exception of the symbols that correspond to touch commands that are already reserved (symbols 62 and 64, in particular). The icon 70 appears under the user's finger when the user places a finger, e.g. a right thumb, on any point of the zone 68.

Finger contact on any point of the zone 68 while the appliance is in autopilot mode will more precisely give rise to the following actions:
  measuring data from the tilt sensors of the appliance, in order to determine its angle of tilt (the positions of the pitching and roll axes 32 and 34 relative to the absolute vertical in a terrestrial frame of reference) at the moment the finger makes contact, with this position then being defined as the new neutral position for subsequent application of commands by tilting;
  deactivating the autopilot and activating reactive mode (with provision for a "neutral zone" to be defined around the contact point, as described below);
  displaying the icon 70 under the user's finger, thereby confirming that the above actions have been properly executed; and
  making available under the user's finger up/down and pivot left/right commands in a manner that is described in greater detail below.

This state lasts so long as the finger remains pressed on the zone 68, whether stationary or moving.

As soon as finger contact is released, the actions opposite to the above actions are executed, with the autopilot being reactivated and with the icon 70 disappearing.

The icon 70 is in fact made up of two icons that are initially superposed, namely a movable icon 72 and a stationary icon 74 or marker. The stationary icon 74 remains displayed at the point of initial contact of the finger on the screen, whereas the movable icon 72 follows the movements of the finger on the same screen in the vicinity of the initial contact point (the finger remaining in contact with the surface of the touch screen, while sliding over it).

In a variant, it is possible to add a horizontal axis to the design of the icon, which axis moves up or down as a function of the imparted pitching tilt angle, and also leans, to match the imparted roll tilt angle. The icon is thus similar to a representation of the horizon, such that the user has visual feedback about the tilt command being imparted. This variant is particularly advantageous in a "head-up" viewing system of the kind described below with reference to FIG. 7.

Figure 4:
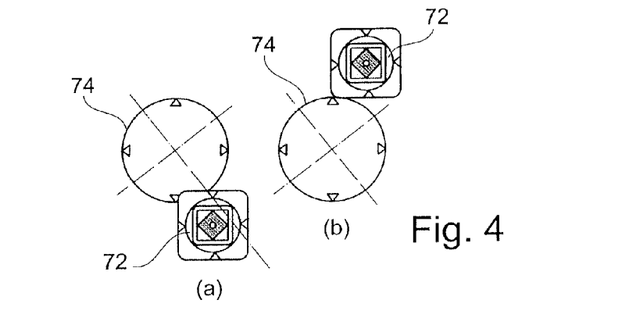
FIGS. 4 and 5 show how it is possible to control various piloting functions by moving a single finger on the touch screen of the appliance.
Figure 5:
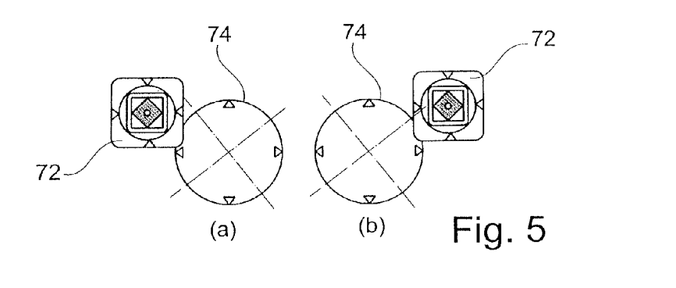

FIGS. 4 and 5 show various relative positions of the movable icon 72 and of the stationary icon 74.

The appliance detects the current position of the movable icon 72 relative to the stationary icon 74 and determines the quadrant in which the center of the movable icon 72 is located relative to the center of the stationary icon 74 on the surface of the screen: north, south, east, or west (the term "north" quadrant thus means the quadrant corresponding to a direction of ±45° relative to the vertical direction relative to the screen, and correspondingly for the other quadrants, mutatis mutandis). The appliance also evaluates the distance between the movable icon and the center of the stationary icon 74.

If the movable icon 72 is located:
  in the south quadrant, as shown in FIG. 4(*a*), this is interpreted as a "down" order (equivalent to pressing on the symbol 48 as shown in FIG. 2), and a corresponding command is sent to the drone;
  in the north quadrant, as shown in FIG. 4(*b*), this is interpreted as being a "up" order (equivalent to pressing on the symbol 46 shown in FIG. 2), and a corresponding command is sent to the drone;
  in the west quadrant as shown in FIG. 5(*a*), this is interpreted as being a "turn to the left in yaw" order (equivalent to pressing on the symbol 50 in FIG. 2), and a corresponding command is sent to the drone; and
  in the east quadrant, as shown in FIG. 5(*b*), this is interpreted as being a "turn to the right in yaw" order (equivalent to pressing on the symbol 52 in FIG. 2), and a corresponding command is sent to the drone.

Advantageously, the command is not an on/off command, but rather a command of amplitude that is modulated as a function of the distance measured between the movable icon and the stationary icon: the command is then proportional to the distance, or indeed it could be modulated using some other relationship, e.g. a logarithmic relationship.

It should be observed that all of the commands are accessible simultaneously and can be combined with one another. For example, the user applies a finger, then tilts the appliance to the left: the drone goes to the left . . . the user shifts the finger to the left: the drone banks and pivots in yaw, simultaneously turning to the left . . . the user moves the finger upwards: the drone climbs in concentric circle, etc.

It is also very easy to have proportional commands (i.e. that do not function simply as on/off commands): the greater the angle of forward tilt of the appliance, the faster the drone advances . . . the more the finger is moved upwards, the greater the rate of climb . . . the more the finger is moved to the left, the more the yaw command is accentuated, etc.

It is thus possible to pilot the drone relative to three axes using a single finger, while simultaneously controlling the speed of the motor by means of the up/down command. These simple commands are transformed by the automatic pilot of the drone into complex commands that not only respond to the piloting setpoints, but also ensure that the drone is stable in all of its attitudes.

Various particular implementation features may be envisaged.

In particular, when the finger initially makes contact with the screen too close to the edge of the touch zone 68, certain commands may be impossible to implement, or may be implemented only with a magnitude that is too small. If such a situation is detected, the appliance briefly activates an alarm, e.g. a vibrator, to inform the user that the finger is badly placed. The piloting software is nevertheless activated in order to respond to commands appropriately in spite of the limitations that result from the position of the finger.

Furthermore, a piloting command trigger threshold may be provided, so that commands are generated only beyond some minimum spacing between the movable icon and the stationary icon, which amounts to defining a neutral zone around the stationary icon 74.

Or indeed, and preferably, the command trigger threshold, e.g. relating to a piloting order, is not taken into account unless the speed of finger movement over the screen is greater than a predetermined minimum speed. This avoids latency due to the fact, in the above-described circumstances, it is necessary to wait for the finger to leave the neutral zone before generating the commands, thereby adding an additional delay that is awkward when controlling the drone.

The corollary of proceeding in this way is that the finger does not necessarily return exactly to the initial point of contact. It is therefore necessary to provide a floating neutral point that is redefined at the position where the finger stops at the end of its return movement (at the end of activating the command). In other words, during the opposite movement of the point of contact (at a movement speed that is greater than a predetermined minimum threshold), the initial position needs to be reset, with the new initial position being redefined as the point where this opposite movement comes to an end.

For example, as soon as the user moves the finger upwards at a certain speed, this is interpreted as being an up order. And as soon as the finger is moved downwards, this means that the user wants to stop moving upwards (it is not necessary to move the finger all the way to the initial neutral point, it suffices to slide the finger downwards at a certain speed in order to interrupt the command). Nevertheless, it can happen that the finger moves a shorter distance downwards than it had moved upwards, and the device must take this into account in order to reestablish the neutral point at the position where the finger stops.

In another variant, activation of the reactive mode may be achieved by tilting the appliance about any axis beyond some predefined minimum tilt threshold value.

In yet another variant, it may be advantageous to separate the commands in order to make the drone simpler to pilot for novice users.

Figure 6:
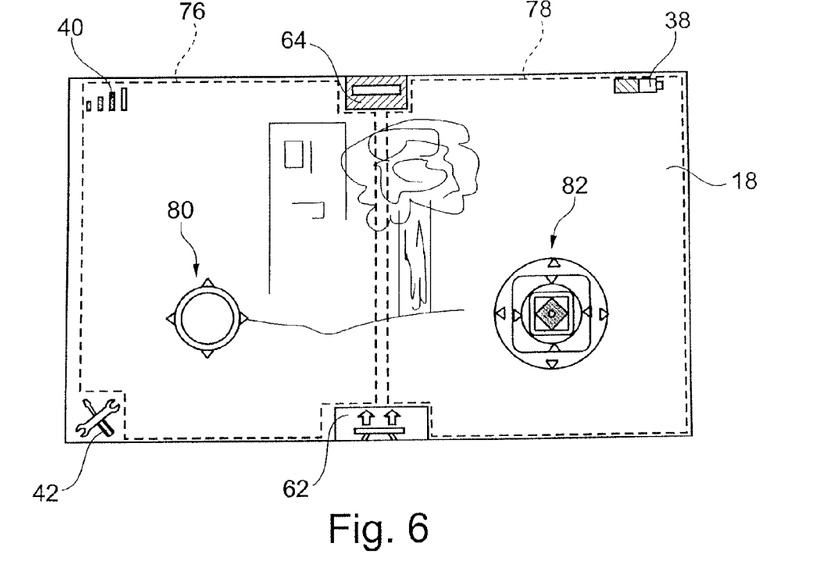
FIG. 6 corresponds to FIG. 3, in a simplified variant.

This variant is shown in FIG. 6, which corresponds to FIG. 3 for the simplified variant.

Some of the commands are available for the right hand and the others for the left hand. In this example, one finger of the right hand is used for yaw control and up/down control, while the left hand is used for rotation commands in pitching and in roll. For this purpose, the screen is divided into two zones 76 and 78, each for receiving commands, and in each of these zones there is a respective icon 80, 82 that appears when the user puts a finger on the zone. The icon 82 is identical to the piloting icon in the implementation of FIGS. 3 to 5, whereas the icon 80 merely indicates that the finger is on the screen.

The new piloting mode described in general terms above presents multiple advantages.

Firstly, the fundamental principle is preserved whereby "taking control" merely requires a finger to be put on a point of the screen, and staying put at a stationary point is ordered (switchover to autopilot mode) merely by "releasing control". This enables an un-practiced user to take control of the drone very easily.

However, in the invention, in order to "take control", i.e. switch to reactive mode, there is no longer any need to press on a precise stationary zone; it suffices to put a finger on a fairly broad zone of the screen, specifically on any point in the right half in the example shown. This can be done intuitively without looking at the screen.

Secondly, once a finger is put on said zone (and kept there), the point of contact becomes the center of the control and it is possible to pilot the drone with only one finger:

by moving the finger to the right the user issues a yaw turn command to the right and causes the drone to pivot clockwise about its own axis, and by moving the finger to the left, while a yaw turn command to the left causes the drone to turn in the opposite direction; and by moving the finger upwards the drone is caused to rise; and by moving the finger downwards, the drone is caused to descend.

The other commands are given by tilting the drone about the two main axes of the appliance:

by tilting the appliance forwards, the drone leans forwards and advances, by tilting the appliance backwards, the drone leans backwards and reverses; and by tilting the appliance to the left, the drone leans to the left and shifts to the left, and by tilting the appliance to the right, the drone leans to the right and shifts to the right.

These four commands may possibly be accompanied by a neutral zone, e.g. by providing some minimum angle to give to the appliance when tilting it in order to execute a roll or pitching command or indeed by moving the finger through a certain minimum distance away from the contact point for the yaw command and the altitude command.

It should be observed that using a single finger serves to reduce the masking of messages and information that are essential for the user.

It is also possible to accommodate left-handed and right-handed users in the same manner, the touch zone for the contact point covering as much of the left-hand side of the screen as it covers the right-hand side.

Furthermore, shooting can be activated with a finger of the hand opposite from the hand being used for piloting commands, by touching a defined zone in the opposite portion of the screen.

Finally, in the simplified variant as described above with reference to FIG. 6, the commands are not grouped together for the same finger, thereby making it simpler for a novice user to coordinate the commands.

Thirdly, another major advance lies in the fact that there is no longer any need to keep the appliance level.

In the past, in order to control the angle of inclination of the drone about two axes by tilting the appliance, it was necessary in reactive piloting mode to put the finger on a precise point of the screen while holding the appliance level.

In the invention, when the user places a finger on the screen in order to switch to reactive mode, the direction of the vertical (measured in a terrestrial absolute frame of reference) is recorded and this direction is used as the new reference direction, i.e. as the neutral point for commands.

It is thus possible to activate reactive mode even on an appliance that is tilted, thereby making the appliance much more convenient to use and serving in particular to avoid sunlight being reflected from the surface of the screen when the drone is being flown out of doors.

Figure 7:
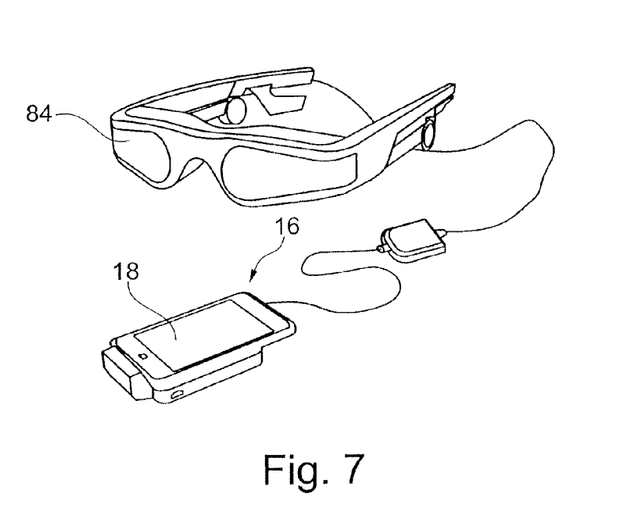
FIG. 7 shows a pair of video glasses connected to the remote-control appliance in order to form a "head-up" type display.

Fourthly, as shown in FIG. 7, the above-described piloting mode lends itself particularly well to use with a head-up display of the type comprising video glasses 84 in association with the appliance 16. These glasses comprise two LCD displays assembled in an eyeglass frame and connected to the video output of the appliance 16. These glasses give greater immersion in the augmented reality universe of the game.

The improvement of the invention, which allows a finger to be put on a board zone of the appliance in order to activate reactive mode and apply piloting commands is an advantage that is particularly suitable for use with such glasses, which prevent the user from looking at the hands or where the finger is placed on the screen of the appliance. In order to reassure a user who cannot see either hand, the position of the finger relative to the control surface is displayed on the screen of the glasses, thereby improving feedback from the appliance, and the user knows exactly what is being commanded (the movable and stationary icons are displayed in the same manner as shown in FIGS. 4 and 5), thereby giving an impression of piloting of the "head-up display" type.

Another aspect of the present invention lies in the way in which auxiliary commands are delivered in the context of the above-described piloting mode.

The drone is an element of a video game in which the player piloting the drone must simultaneously perform game actions, e.g. shooting virtual targets (adversary or enemy objective displayed on the screen in an augmented reality game) or on real targets provided with detector zones (stationary targets or another drone in a chase game).

The shooting command must be activated very quickly, almost instinctively, by the player if there is to be any chance of hitting the intended target.

While "reactive mode" is activated, the player is piloting the drone. The player is thus fully occupied by the piloting, the player's hands are busy, and the player's eyesight is concentrating on looking at the drone.

This applies in particular with the above-mentioned variant in which the commands are split between the right and left portions of the screen of the remote-control appliance, with some of the commands being available for the right hand and the others for the left hand (e.g. a finger of the right hand for throttle and yaw commands, and a finger of the left hand for pitching and roll pivot commands).

To mitigate that drawback, the invention proposes an "assisted shooting" mode of operation in which the player is initially alerted by a sound event emitted by the remote-control appliance when the shape recognition software of one of the cameras of the drone identifies the target, as defined by the game software implemented in the appliance.

The player can then trigger the order to shoot by shaking the remote-control appliance, without interrupting piloting and without moving the hands and without taking the eyes off the drone. The accelerometer incorporated in the remote-control appliance responds to being shaken, and delivers the order to shoot to the game software, and the virtual weapon fires.

The shake is sensed by the accelerometer of the remote-control appliance in the form of an acceleration signal peak, which peak is easily distinguished from other commands operated via the accelerometer by means of a highpass filter that determines whether a movement continues beyond a threshold (the jolt imparted by the user) about at least one of the axes of the accelerometer.

During the short period of time that the acceleration peak as detected by the accelerometer lasts, the other flight commands controlled by the same accelerometer are conserved in their previous states so that the shake is not interpreted as a piloting command and has no effect on controlling the movement of the drone, and thus on controlling how it behaves in the air.

What is claimed is:

1. A method of implementing a remote-control appliance for a drone, in particular a rotary wing drone, the appliance being a portable appliance comprising: a touch screen for detecting at least one contact of a user's finger on a surface of the screen and for determining a position of said at least one finger contact point relative to a corresponding symbol displayed on the screen; and wireless data transmission device for issuing commands to the drone;

the method comprising activating drone piloting commands by the finger making contact with the screen or moving over the screen at the locations of corresponding piloting symbols displayed on the screen;

the method being characterized by:
a) detecting finger contact at an arbitrary contact point in at least one predefined zone of the screen;
b) displaying on the screen, at said contact point, a piloting icon comprising a movable icon displayed on the screen at a position that tracks the movement of any of the finger contact point on the screen from an initial position to an offset position;
c) detecting said movement of the movable icon;
d) on detecting said movement, analyzing a direction or an amplitude or a speed of said movement relative to the initial position; and
g) activating a piloting command as a function of a result of said analysis, the method further wherein for remotely controlling a rotary wing drone provided with a selectively activatable system for independently stabilizing the drone in hovering flight in the absence of any command transmitted by the appliance, wherein the independent stabilization system is deactivated in response to detecting said finger in a).

2. The method of claim 1, further comprising, after analyzing the direction or the amplitude or the speed of said movement relative to the initial position:
e) discriminating said piloting command to be activated in g) from amongst a plurality of different piloting commands, as a function of the direction of said movement.

3. The method of claim 2, wherein said piloting command for activating in g) is a command for causing the drone to move up or down when the direction of said movement is oriented mainly upwards or downwards, respectively, relative to an orientation of an image displayed on the touch screen.

4. The method of claim 2, wherein said piloting command for activating in g) is to pivot left or right about a yaw axis of the drone when the direction of said movement is mainly oriented to the left or to the right, respectively, relative to an orientation of an image displayed on the touch screen.

5. The method of claim 1, further comprising, after analyzing the direction or the amplitude of said movement relative to the initial position:
f) quantifying said piloting command to be activated in g) as a function of the amplitude of said movement.

6. The method of claim 1, wherein the independent stabilization system remains deactivated after a) throughout the duration in which said finger contact is detected, and is activated in response to detecting a loss of contact.

7. The method of claim 1, wherein the piloting icon displayed in b) comprises, in addition to the movable icon, a stationary reference icon which continues to be displayed on the screen at the initial finger contact point position even in the event of subsequent movement of the contact point.

8. The method of claim 1, for implementing an appliance including sensors for detecting an angle of inclination of the appliance about two axes relative to a neutral reference axis in a terrestrial frame of reference, wherein detecting said finger contact in a) activates:
recording the direction of terrestrial vertical relative to the frame of reference of the appliance at the moment contact is detected; and
designating this vertical as the new reference axis.

9. The method of claim 8, further comprising activating a piloting command for pivoting about a pitching axis or about a roll axis, as a function of the angle of inclination of the appliance as detected respectively about one or the other of said two axes relative to the reference axis.

10. The method of claim 9, including defining a neutral angular range about the reference axis such that pitching and roll commands are activated only for angles of inclination of the appliance outside said neutral angular range.

11. The method of claim 10, for remotely controlling a rotary wing drone provided with a selectively activatable system for independently stabilizing the drone in hovering flight in the absence of a command transmitted by the appliance, wherein the independent stabilization system is deactivated only for an angle of inclination of the appliance outside said neutral angular range.

12. The method of claim 1, for implementing an appliance that includes an accelerometer sensor, the method including:
detecting an acceleration peak imparted to the appliance by a user; and
generating a command in response to said detecting of a peak.

13. The method of claim 12, wherein said command is a shoot command applied as input to said appliance.

14. The method of claim 12, wherein the detection includes highpass filtering of the acceleration signal delivered by the accelerometer sensor of the appliance.

15. The method of claim 12, also comprising:
recording the state of the piloting commands on detecting an acceleration peak; and
maintaining said state throughout the duration of the acceleration peak.

16. The method of claim 1, for implementing an appliance coupled to a remote display peripheral, in particular video glasses, including the remote peripheral duplicating of said piloting icon displayed on the screen so as to provide a heads-up type display.

17. The method of claim 1, further including emitting an alert signal when a minimum distance between the contact point detected in a) and an edge of said predefined zone of the screen is less than a predetermined distance.

18. The method of claim 1, including defining a neutral zone around the contact point detected in a), the neutral zone being such that the movement of the movable icon in c) and d) is not taken into account unless the offset position lies beyond said neutral zone.

19. The method of claim 1, including defining a neutral zone around the contact point detected in a), the neutral zone being such that the movement of the piloting icon in c) and d) is not taken into account unless the speed of the movement of the finger contact point on the screen relative to the initial position is greater than a predetermined minimum threshold.

20. The method of claim 19, further including, in the event of the contact point moving in a reverse movement, the reverse movement being an opposite direction to the movement, at a movement speed that is greater than another predetermined minimum threshold, resetting said initial position, the new initial position being redefined by the point where said reverse movement comes to an end.

21. An appliance for remotely controlling a drone, in particular a rotary wing drone, wherein the appliance is a portable appliance comprising:
a touch screen for detecting the contact of a user's finger on the surface of the screen and for determining the position of the point of contact of said finger relative to a corresponding symbol displayed on the screen;
wireless data transmission device for transmitting commands to the drone; and
a processing component for implementing a method of implementing a remote-control appliance for a drone, in particular a rotary wing drone;
the method comprising activating drone piloting commands by the finger making contact with the screen or moving over the screen at the locations of corresponding piloting symbols displayed on the screen;
the method being characterized by:
a) detecting finger contact at an arbitrary contact point in at least one predefined zone of the screen;
b) displaying on the screen, at said contact point, a piloting icon comprising a movable icon displayed on the screen at a position that tracks the movement of any of the finger contact point on the screen from an initial position to an offset position;
c) detecting said movement of the movable icon;
d) on detecting said movement, analyzing a direction or an amplitude or a speed of said movement relative to the initial position; and
g) activating a piloting command as a function of a result of said analysis, the method further wherein for remotely controlling a rotary wing drone provided with a selectively activatable system for independently stabilizing the drone in hovering flight in the absence of any command transmitted by the appliance, wherein the independent stabilization system is deactivated in response to detecting said finger in a), the method further including defining a neutral zone around the contact point detected in a), the neutral zone being defined in such a manner that the independent stabilization system remains activated so long as the position of the current finger contact point remains within said neutral zone.

22. A non-transitory computer readable medium of a portable appliance, the non-transitory computer readable medium configured for storing an application, the application comprising:
a touch screen for detecting the contact of a user's finger on the surface of the screen and for determining the position of the point of contact of said finger relative to a corresponding symbol displayed on the screen; and
wireless data transmission device for transmitting commands to the drone;
the application including instructions suitable for implementing a method of implementing a remote-control appliance for a drone, in particular a rotary wing drone;
the method comprising activating drone piloting commands by the finger making contact with the screen or moving over the screen at the locations of corresponding piloting symbols displayed on the screen;
the method being characterized by:
a) detecting finger contact at an arbitrary contact point in at least one predefined zone of the screen;
b) displaying on the screen, at said contact point, a piloting icon comprising a movable icon displayed on the screen at a position that tracks the movement of any of the finger contact point on the screen from an initial position to an offset position;

c) detecting said movement of the movable icon;

d) on detecting said movement, analyzing a direction or an amplitude or a speed of said movement relative to the initial position; and g) activating a piloting command as a function of a result of said analysis, the method further wherein for remotely controlling a rotary wing drone provided with a selectively activatable system for independently stabilizing the drone in hovering flight in the absence of any command transmitted by the appliance, wherein the independent stabilization system is deactivated in response to detecting said finger in a), the method further including defining a neutral zone around the contact point detected in a), the neutral zone being defined in such a manner that the independent stabilization system remains activated so long as the position of the current finger contact point remains within said neutral zone.

23. The method of claim 1, wherein the displaying on the screen of the piloting icon in b) is based on the contact point.

* * * * *